(12) United States Patent
Hu

(10) Patent No.: US 9,248,730 B2
(45) Date of Patent: Feb. 2, 2016

(54) SHELTER FOR VEHICLE AND METHOD THEREOF

(71) Applicant: Zhangquan Hu, Ningbo (CN)

(72) Inventor: Zhangquan Hu, Ningbo (CN)

( * ) Notice: Subject to any disclaimer, the term of this patent is extended or adjusted under 35 U.S.C. 154(b) by 0 days.

(21) Appl. No.: 14/541,089

(22) Filed: Nov. 13, 2014

(65) Prior Publication Data

US 2015/0367717 A1 Dec. 24, 2015

Related U.S. Application Data

(60) Provisional application No. 62/016,104, filed on Jun. 24, 2014.

(51) Int. Cl.
*B60J 11/04* (2006.01)

(52) U.S. Cl.
CPC ........................................ *B60J 11/04* (2013.01)

(58) Field of Classification Search
CPC ............. B60J 11/00; B60J 11/08; B60J 11/04
USPC ............... 296/136.1, 136.13, 136.04, 136.12, 296/136.11, 136.02, 136.03, 98; 150/166
See application file for complete search history.

(56) References Cited

U.S. PATENT DOCUMENTS

| | | | | |
|---|---|---|---|---|
| 5,029,933 | A * | 7/1991 | Gillem | 296/136.11 |
| 5,275,460 | A * | 1/1994 | Kraus | B60J 11/06 150/166 |
| 5,364,156 | A * | 11/1994 | Zerow | B60J 11/00 296/136.13 |
| 6,997,503 | B2 * | 2/2006 | Fukagawa | B60J 11/02 150/166 |
| 7,213,868 | B1 * | 5/2007 | Tan et al. | 296/136.04 |
| 2005/0194813 | A1 * | 9/2005 | Haddock | B66F 9/07513 296/136.1 |
| 2007/0096501 | A1 * | 5/2007 | Tan | B60J 11/00 296/136.1 |
| 2007/0177265 | A1 * | 8/2007 | Focardi | 359/509 |
| 2009/0102230 | A1 * | 4/2009 | Pehrson | B60J 11/08 296/136.13 |
| 2009/0236870 | A1 * | 9/2009 | Duncan | 296/136.04 |
| 2011/0095561 | A1 * | 4/2011 | Li | B60J 11/04 296/136.13 |
| 2012/0007385 | A1 * | 1/2012 | Ramesh | 296/136.04 |
| 2012/0261940 | A1 * | 10/2012 | Gees | 296/136.04 |
| 2013/0300149 | A1 * | 11/2013 | Dao | 296/136.04 |

* cited by examiner

*Primary Examiner* — Pinel Romain
(74) *Attorney, Agent, or Firm* — Raymond Y. Chan; David and Raymond Patent Firm

(57) ABSTRACT

A shelter for a vehicle includes a container member adapted for being detachably affixed at a rear side of said vehicle and a cover arrangement including a utility body having a rear lateral side extended from the container member. The utility body is normally stored in the container member when it is not in use. The utility body is large enough to cover an outer surface of the vehicle that the utility body is unfolded to extend a front lateral side from the container member toward a front side of said vehicle for covering the vehicle.
a cover arrangement and a accessory unit, wherein the cover arrangement comprises a utility body for covering the surface of the vehicle, and a traction member provided at the lateral of the utility body, wherein the accessory unit comprises a container member defining a receiving cavity for storing the utility body, and a first elongated supporting element provided edge of the container member, wherein the utility body is capable of extending from the traction member to the container member, wherein the first elongated supporting element can be positioned at the rear portion of the vehicle and the traction member can be positioned at the front portion of the vehicle when the utility body is in use.

21 Claims, 16 Drawing Sheets

SHELTER FOR VEHICLE AND METHOD THEREOF

CROSS REFERENCE OF RELATED APPLICATION

This is a non-provisional application that claims the benefit of priority under 35 U.S.C. §119 to a provisional application, application No. 62/016,104, filed Jun. 24, 2014.

BACKGROUND OF THE PRESENT INVENTION

1. Field of Invention

The present invention relates to a accessory for vehicle, and more particularly to a shelter for vehicle, wherein the shelter for vehicle comprises a cover arrangement comprising a utility body and a traction member provided at the lateral of the utility body in such a manner that the utility body is capable of covering the surface of the vehicle conveniently and easily.

2. Description of Related Arts

Shelter are very frequently used to protect vehicles from sun, dusk, rain, snow and so on, wherein the shelter comprises a single layer of material that is fitted to cover the vehicle.

As shown in FIG. 1 of the drawings, illustrating a conventional shelter for vehicle, wherein the conventional shelter for vehicle comprises a plurality of area element, wherein the edges of adjacent the area elements join together for forming the entire shelter. As an example, the conventional shelter comprises a first area element 1 having a first edge 1a, and a second area element 2 having a second edge 2a, wherein the first edge 1a of the first area element 1 positions at the lateral of the second edge 2a of the second area element 2, to form a groove 3a, wherein the opening of the groove 3a towards to the first area element 1 wherein the shelter is in use, that is, the groove 3a cannot prevent the water into the interior surface form the exterior of the shelter. Particularly, the conventional shelter cannot be used in the strong wind.

It is necessary to develop a shelter for vehicle to solve the above problem as mentioned before to keep the shelter conveniently and easily to use.

SUMMARY OF THE PRESENT INVENTION

A main object of the present invention is to provide a shelter for vehicle, wherein the shelter for vehicle comprises a cover arrangement comprising a utility body and a traction member provided at the front lateral side of the utility body in such a manner that the utility body is capable of pulling forward via the traction member for covering the surface of the vehicle conveniently and easily.

Another object of the present invention is to provide a shelter for vehicle, wherein the shelter for vehicle comprises an accessory unit comprising a container member and a plurality of fastening member, wherein one end of the fastening member extends to the container member, and another end of the fastening member forms a free end for detachably connecting the vehicle conveniently and reliably.

Another object of the present invention is to provide a shelter for vehicle, wherein the accessory unit can be hidden underside of the cover arrangement.

Another object of the present invention is to provide a shelter for vehicle, wherein the container member further has a receiving cavity for storing the utility body of the cover arrangement after the utility body is removed from the surface of the vehicle.

Another object of the present invention is to provide a shelter for vehicle, wherein the accessory unit comprises a first elongated supporting element and a second elongated supporting element respectively provided at the edges of the receiving cavity of the container member, wherein the first elongated supporting element is capable of matching with the second elongated supporting element so as to receive the utility body within the receiving cavity of the container member conveniently and easily.

Another object of the present invention is to provide a shelter for vehicle, wherein the cover arrangement comprises a crimple member provided along the edge of the utility body, wherein the crimple member is capable of automatically minimizing the size of the edge of the utility body in such a manner that the utility body can cover the surface of the vehicle steadily and reliably.

Another object of the present invention is to provide a shelter for vehicle, wherein the cover arrangement comprises a plurality of lockers spacedly provided on the interior surface of the utility body, wherein each of the lockers is capable of locking at the vehicle in such a manner that the utility body can be covered the surface of the vehicle steadily and reliably.

Another object of the present invention is to provide a shelter for vehicle, wherein the exterior surface and the interior surface of the utility body are not contact with each other to avoid the pollutant on the exterior surface pollute the interior surface.

Another object of the present invention is to provide a shelter for vehicle, wherein the traction member is able to be lengthened for allowing the user to pull the utility body forward via the traction member and for supporting the utility body at the front side of the vehicle.

Another object of the present invention is to provide a shelter for vehicle, wherein the utility body comprises a heat block layer formed the exterior surface, and a soft layer formed the interior surface, wherein the heat block layer and the soft layer overlap with each other for forming the utility body. The heat block layer is also a waterproof layer.

Another object of the present invention is to provide a shelter for vehicle with simple structure to reduce the manufacturing cost and to meet the need of the market.

Another object of the present invention is to provide a shelter for vehicle, wherein no expensive or complicated structure is required to employ in the present invention in order to achieve above mentioned objects.

Additional object and advantages and features of the invention will become apparent form the description, which follows and may be realized by means of the instrumentalities and combinations particular point out in the appended claim.

According to the present invention, the foregoing and other objects and advantages and attained by a shelter for vehicle, for covering the surface of the vehicle, which comprises:

a accessory unit, wherein the accessory unit comprises a container member and a plurality of fastening member, wherein one end of the fastening member extend to the container member, another end of the fastening member forms a free end for fixing on the vehicle; and a cover arrangement, wherein the cover arrangement comprises a utility body, and a traction member provided at the lateral of the utility body in such a manner that the utility body is capable of covering the surface of the vehicle conveniently and easily, wherein the utility body extends from the traction member to the container member of the accessory unit.

According to the preferred embodiment of the present invention, wherein the container member has a front wall, a rear wall, and two sidewall respectively having two edges extended to the edges of the front wall and the rear wall, to define a receiving cavity for storing the utility body of the cover arrangement, wherein the utility body extends from the traction member to the edge of the front wall of the container member.

According to the preferred embodiment of the present invention, wherein the accessory unit further comprises a first elongated supporting element provided on the edge of the front wall of the container member, wherein the first elongated supporting element is capable of positioning at the rear portion of the vehicle, and the traction member is capable of positioning at the front portion of the vehicle.

According to the preferred embodiment of the present invention, wherein the accessory unit further comprises a second elongated supporting element provided on the edge of the rear wall of the container member, wherein the utility body connects with the rear wall.

According to the preferred embodiment of the present invention, wherein the utility body comprises an extended element extended to the rear wall of the contain member in such a manner that the size of the receiving cavity is capable of matching with the utility body suitably.

According to the preferred embodiment of the present invention, wherein the accessory unit further comprises a plurality of connecting locker member, wherein the connecting locker member comprises a first connecting locker element provided on the front wall, and a second connecting locker element provided on the rear wall selectively locked with the first connecting locker element for sealing the opening of the receiving cavity after the utility body stored in the receiving cavity.

According to the preferred embodiment of the present invention, wherein the fastening member comprises a first fastening element extended to the container member, and a second fastening element is capable of fixing of the vehicle, wherein the first fastening element is capable of connecting with the second fastening element for fixing the shelter for vehicle of the vehicle.

According to the preferred embodiment of the present invention, wherein the fastening member further comprises a first connector element provided on the end of the first fastening element, and a second connector element provided on the end of the second fastening element, wherein the first connector element is capable of connecting with the second connector element.

According to the preferred embodiment of the present invention, wherein the cover arrangement further comprises a crimple member comprising two elastic crimple element symmetrically provided along the edge of the utility body from the first elongated supporting element to a predetermined portion, to form pleated type structure.

According to the preferred embodiment of the present invention, wherein the crimple member further comprises two non-elastic crimple element symmetrically provided along the edge of the utility body from the traction member a predetermined portion, wherein the edge of the utility body is capable of forming a pleated type structure when the free end of the non-elastic crimple element be pulled.

According to the preferred embodiment of the present invention, wherein the traction comprises a first traction element having a guider channel and a second traction element designed in the guider channel, wherein the second traction element is capable of moving along track formed by the guider channel.

According to the preferred embodiment of the present invention, wherein the utility body comprises two or more area element, wherein the edge of adjacent the area element overlaps each other to form a stitch groove, wherein the opening of the stitch groove towards to the outer edge of the utility body.

According to the preferred embodiment of the present invention, wherein the utility body further comprises a heat block layer formed the exterior surface, and a soft layer formed the interior surface, wherein the heat layer and the soft layer are overlapped with each other for forming the utility body.

The present invention further provide a shelter for vehicle, which comprises:

an accessory unit, wherein the accessory unit comprises a container member and a first elongated supporting element provided on the lateral of the container member; and a cover arrangement, wherein the cover arrangement comprises a utility body, and a traction member provided at the lateral of the utility body, wherein the utility body extend from the traction member to the first elongated supporting member; wherein the first elongated supporting element is capable of positioning at the rear portion of the vehicle, and the traction member is capable of positioning at the front portion of the vehicle.

According to the preferred embodiment of the present invention, wherein the accessory unit comprise a plurality of fastening member, wherein one end of the fastening member extend to the container member, another end of the fastening member forms a free end for fixing on the vehicle.

According to the preferred embodiment of the present invention, wherein the fastening member comprises a first fastening element extended to the container member, and a second fastening element is capable of fixing of the vehicle, wherein the first fastening element is capable of connecting with the second fastening element for fixing the shelter for vehicle of the vehicle.

According to the preferred embodiment of the present invention, wherein the fastening member further comprises a first connector element provided on the end of the first fastening element, and a second connector element provided on the end of the second fastening element, wherein the first connector element is capable of connecting with the second connector element.

According to the preferred embodiment of the present invention, wherein the container member has a front wall, a rear wall, and two sidewall respectively having two edges extended to the edges of the front wall and the rear wall, to define a receiving cavity for storing the utility body of the cover arrangement, wherein the utility body extends from the traction member to the edge of the front wall of the container member.

According to the preferred embodiment of the present invention, wherein the accessory unit further comprises a second elongated supporting element provided on the edge of the rear wall of the container member, wherein the utility body connects with the rear wall.

According to the preferred embodiment of the present invention, wherein the accessory unit further comprises a plurality of connecting locker member, wherein the connecting locker member comprises a first connecting locker element provided on the front wall, and a second connecting locker element provided on the rear wall selectively locked with the first connecting locker element for sealing the opening of the receiving cavity after the utility body stored in the receiving cavity.

According to the preferred embodiment of the present invention, wherein the cover arrangement further comprises a crimple member comprising two elastic crimple element symmetrically provided along the edge of the utility body from the first elongated supporting element to a predetermined portion, to form pleated type structure.

According to the preferred embodiment of the present invention, wherein the crimple member further comprises two non-elastic crimple element symmetrically provided along the edge of the utility body from the traction member a predetermined portion, wherein the edge of the utility body is capable of forming a pleated type structure when the free end of the non-elastic crimple element be pulled.

According to the preferred embodiment of the present invention, wherein the traction comprises a first traction element having a guider channel and a second traction element designed in the guider channel, wherein the second traction element is capable of moving along track formed by the guider channel.

According to the preferred embodiment of the present invention, wherein the utility body comprises two or more area element, wherein the edge of adjacent the area element overlaps each other to form a stitch groove, wherein the opening of the stitch groove towards to the outer edge of the utility body.

The present invention further provide a method, which comprises following step:

(a) providing a first elongated supporting element provided on the lateral of a utility body, wherein the first elongated supporting element is capable of positioning the utility body at rear portion of a vehicle; and (b) providing a traction member provided on the other lateral of the utility body for help use move the utility body from the rear portion to the front portion, wherein the traction member is capable of positioning the utility body at the front portion of the vehicle.

According to the preferred embodiment of the present invention, further comprising:

forming a receiving cavity by a container member, wherein the container member has a front wall, a rear wall, and two sidewall respectively having two edges extended to the edges of the front wall and the rear wall, to define the receiving cavity for storing the utility body of the cover arrangement; wherein the first elongated supporting element positions at the edge of the front wall.

According to the preferred embodiment of the present invention, further comprising:

providing a second elongated supporting element provided on the rear wall of the container member, wherein the utility body connects with the rear wall of the container member.

According to the preferred embodiment of the present invention, further comprising:

providing a plurality of fastening member, wherein one end of the fastening member extend to the container member, another end of the fastening member forms a free end for fixing on the vehicle.

According to the preferred embodiment of the present invention, further comprises:

providing two elastic crimple elements symmetrically along the edge of the utility body from the first elongated supporting element to a predetermined portion, to form pleated type structure.

According to the preferred embodiment of the present invention, further comprises:

providing two non-elastic crimple elements symmetrically along the edge of the utility body from the traction member a predetermined portion, wherein the edge of the utility body is capable of forming a pleated type structure when the free end of the non-elastic crimple element is pulled.

Still further objects and advantages will become apparent from a consideration of the ensuing description and drawings.

Theses and other objectives, features, and advantages of the present invention will become apparent from the following detailed description, the accompanying drawings, and the appended claims.

DETAILED DESCRIPTION OF THE PREFERRED EMBODIMENT

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

Referring to the FIGS. 2A to 13C of the drawings, a shelter for vehicle according to a preferred embodiment of the present invention is illustrated, wherein the shelter for vehicle comprises a cover arrangement 10 and an accessory unit 20.

According to the present invention, the vehicle may include a car, a truck, a boat, or the like. It is worth mentioning that the car is shown as an example to illustrate the details of the shelter for vehicle according to the preferred embodiment of the present invention.

Figure 1:
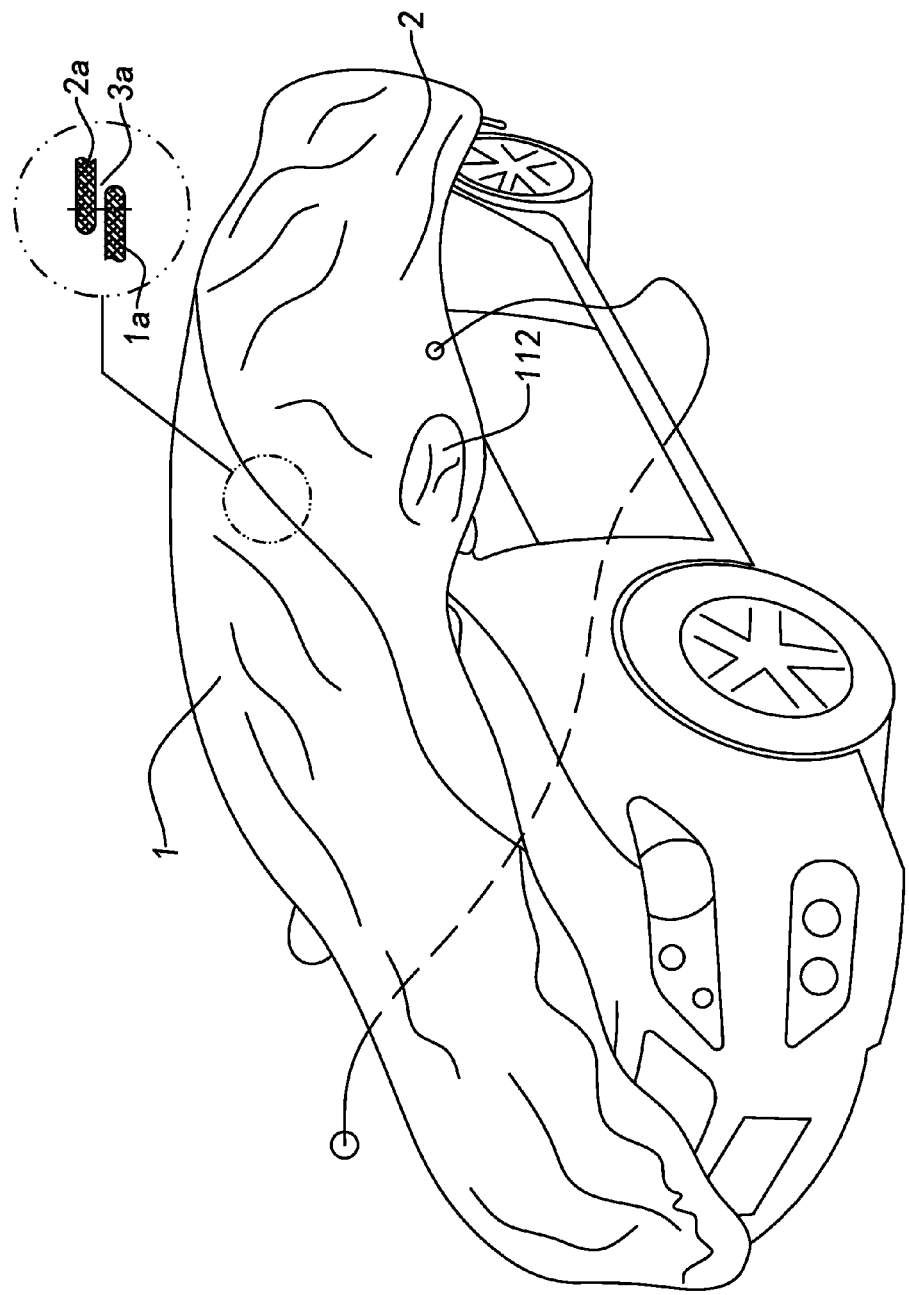
FIG. 1 is a perspective view of a conventional shelter for vehicle.
Figure 2A:
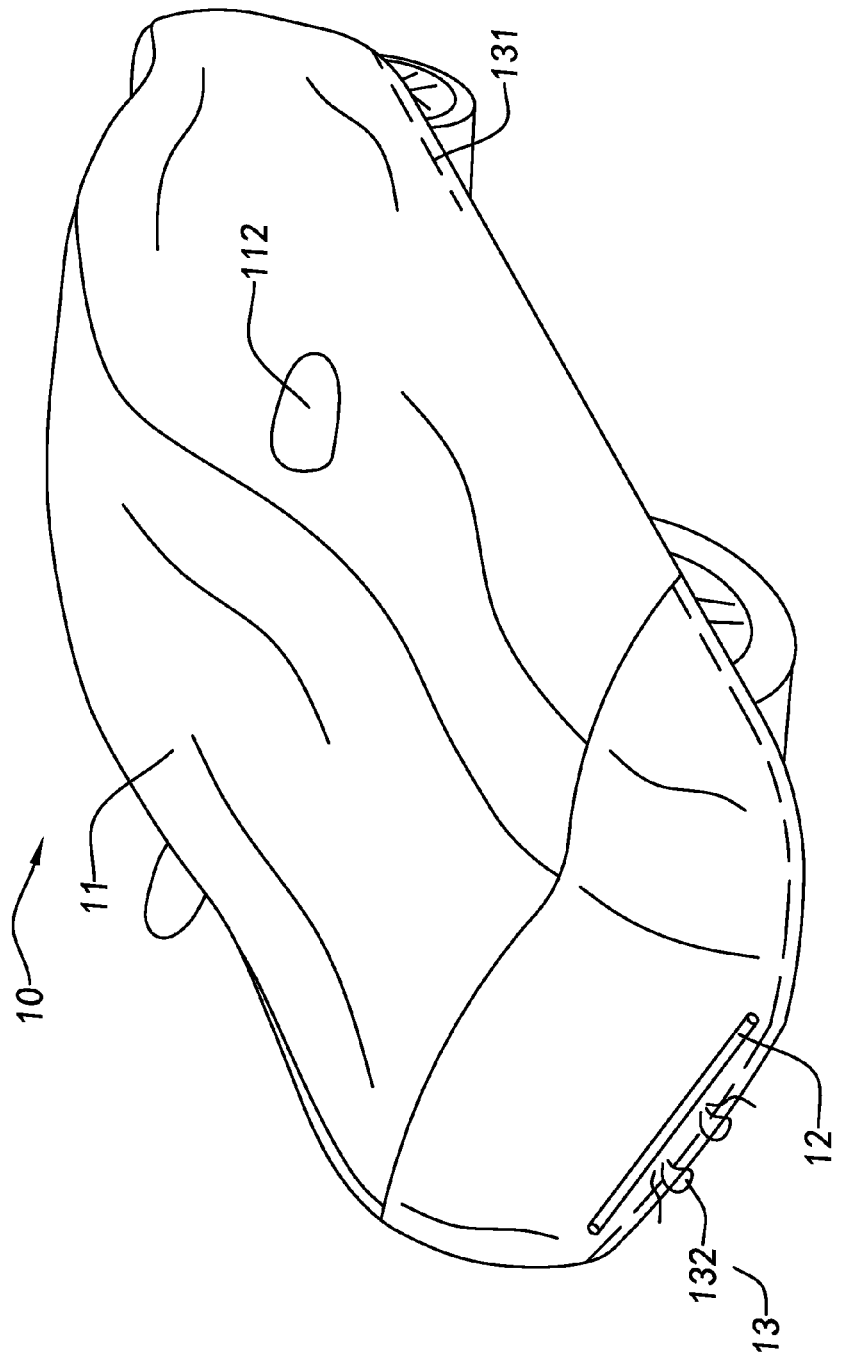
FIG. 2A is a front perspective view of a shelter for vehicle according to a preferred embodiment of present invention, illustrating the use of its state.
Figure 2B:
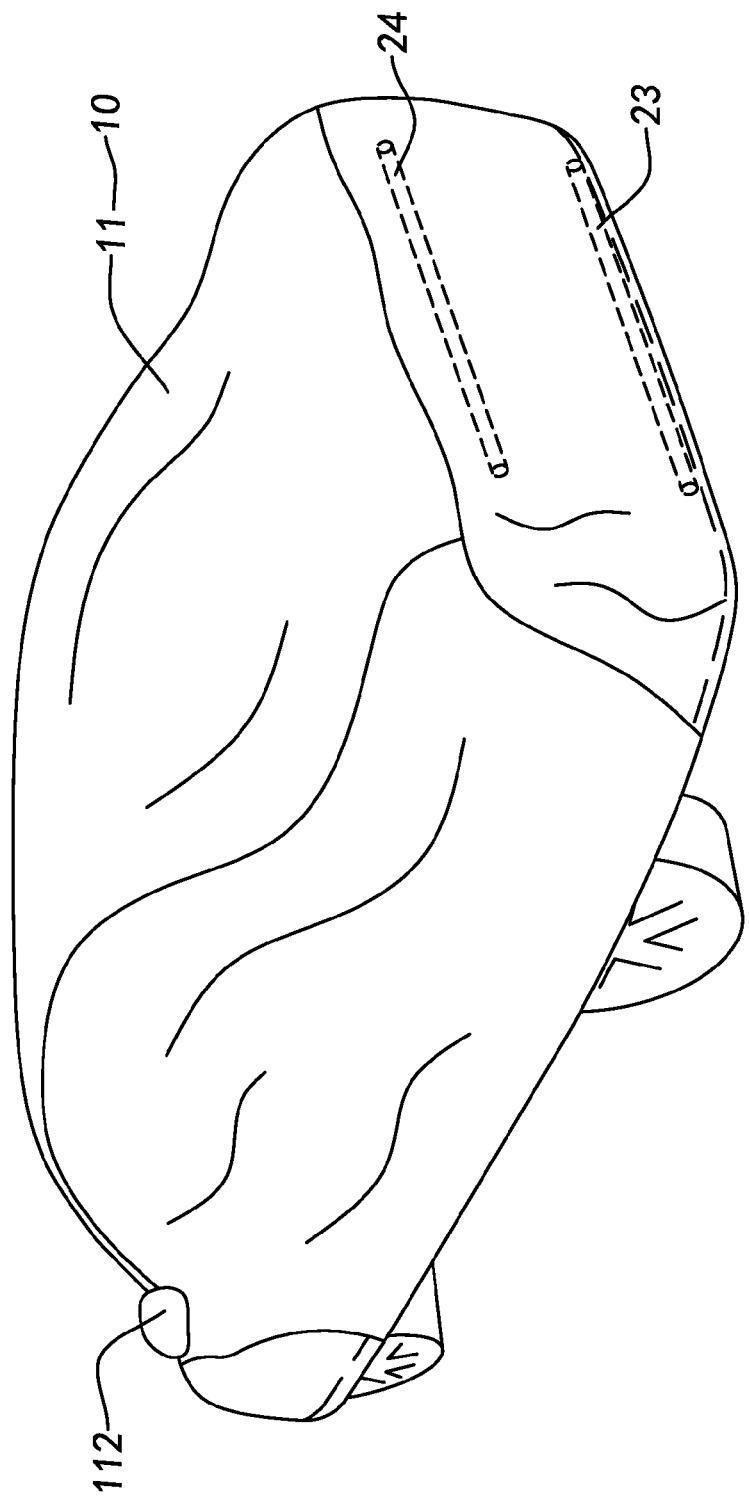
FIG. 2B is a rear perspective view of the shelter for vehicle according to the above preferred embodiment of the present invention, illustrating the use of its state.

According to the preferred embodiment of the present invention, as shown in FIG. 2A and FIG. 2B of the drawings, the cover arrangement 10 comprises a utility body 11 and a traction member 12 provided at the front lateral side of the utility body 11 in such a manner that the utility body 11 is unfolded for covering the surface of the vehicle conveniently and easily, wherein the utility body 11 extends and connects from the traction member 12 to the accessory unit 20, such that when the utility body 11 is unfolded to cover the vehicle, the traction member 12 is able to retain the front lateral side of the utility body 11 at the front side of the vehicle.

It is worth mentioning that the utility body 11 is made of soft material, such as cotton cloth, fiber cloth or the likes in such a manner that the utility body 11 is capable of be automatically adjusted according to the feature of the vehicle to joint at the surface of the vehicle suitably.

Moreover, the accessory unit 20 can be hidden underside of the utility body 11 of the cover arrangement 10 when the shelter for vehicle in using.

Accordingly, the accessory unit 20 comprises a container member 21 and a plurality of fastening members 22, wherein one end of the fastening member 22 is extended to the container member 21, another end of the fastening member 22 forms a free end for fixing on the vehicle conveniently and reliably.

The container member 21 further defines a receiving cavity 21 for storing the utility body 11 when the utility body 11 is folded up, in such a manner that the storage space can be minimized. In particular, the container member 21 is unfolded for covering the rear side of the vehicle.

Figure 3A:
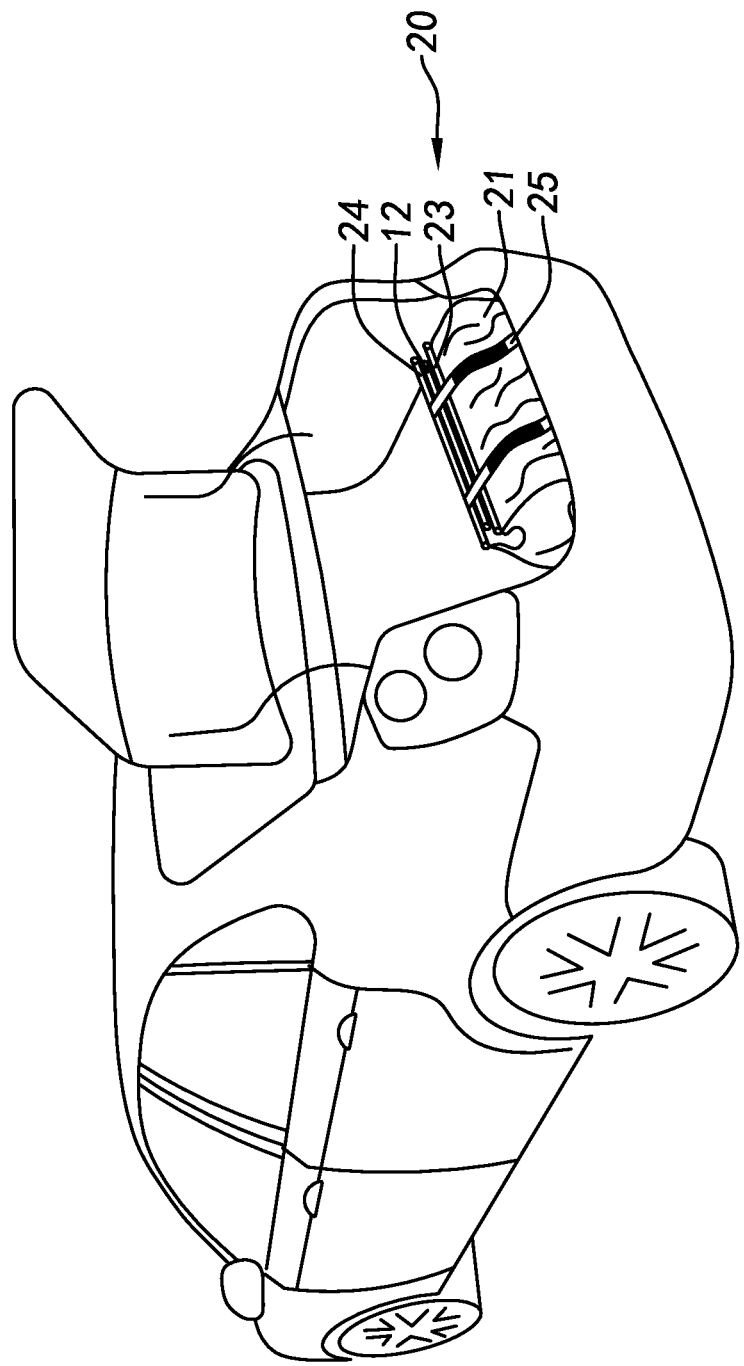
FIG. 3A and FIG. 3B are two perspective views of the shelter for vehicle according to the above preferred embodiment of the present invention, illustrating the non-use of its state.
Figure 3B:
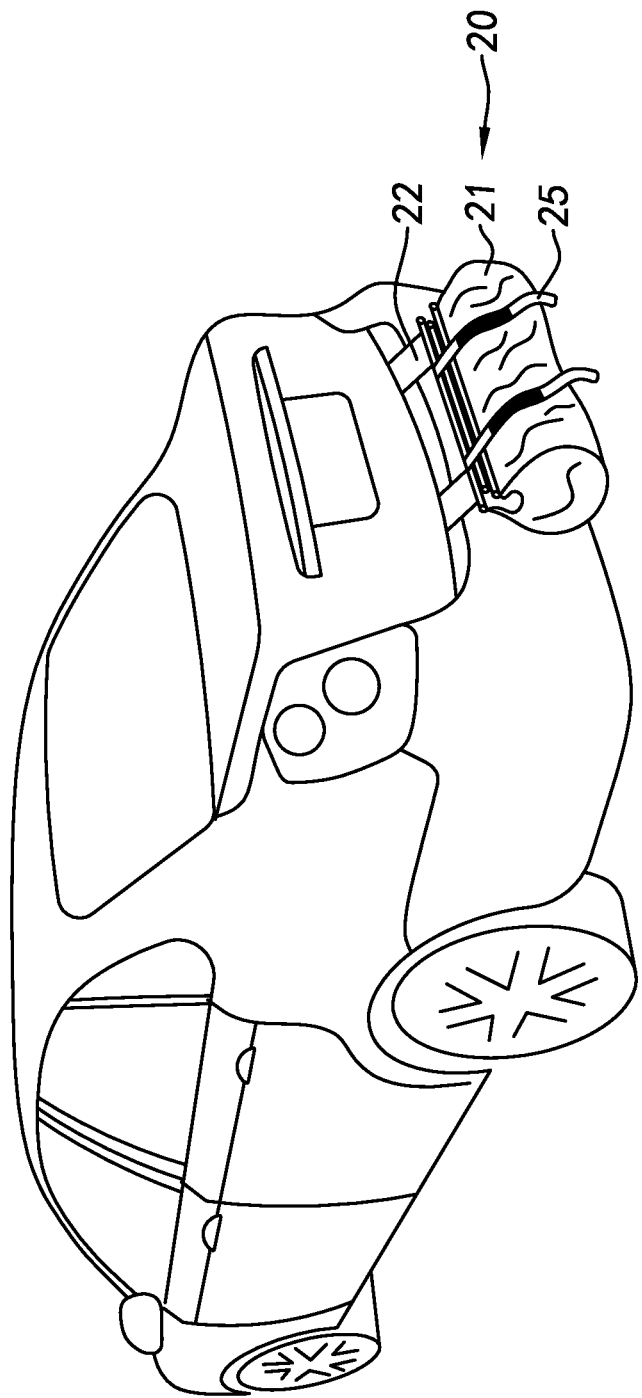

As shown in FIG. 3A and FIG. 3B of the drawings, the shelter for vehicle can be stored in the trunk or hung at the rear bumper of the vehicle when the shelter for vehicle is not in use. The free end of the fastening member 22 is capable of fixing on the vehicle, and the door of the trunk can produce pressure when it is in a closed position for holding the fastening member 22 in such a manner that the shelter for vehicle is not slip off from the vehicle.

Figure 4A:
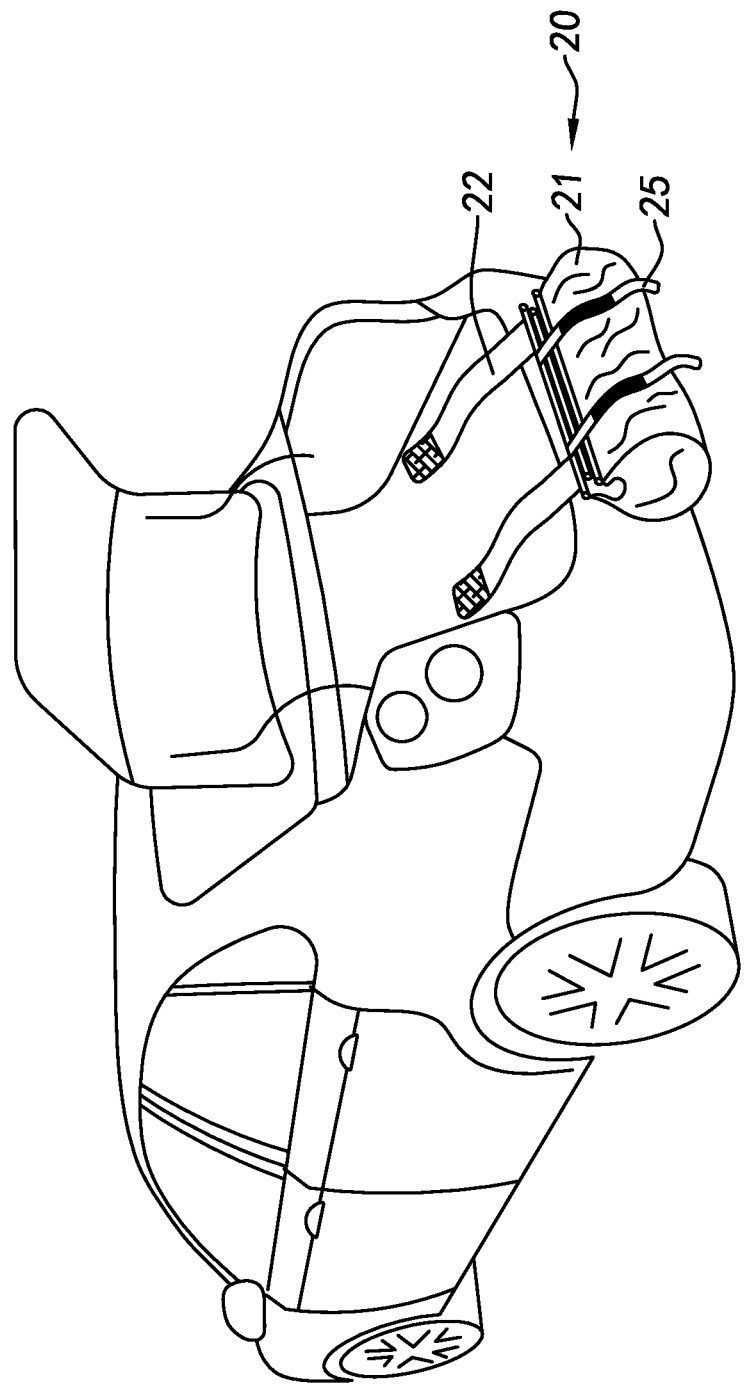
FIG. 4A and FIG. 4B are two perspective views of a fastening member of the shelter for vehicle according to the above preferred embodiment of the present invention, illustrating the different location of the fastening member.
Figure 4B:
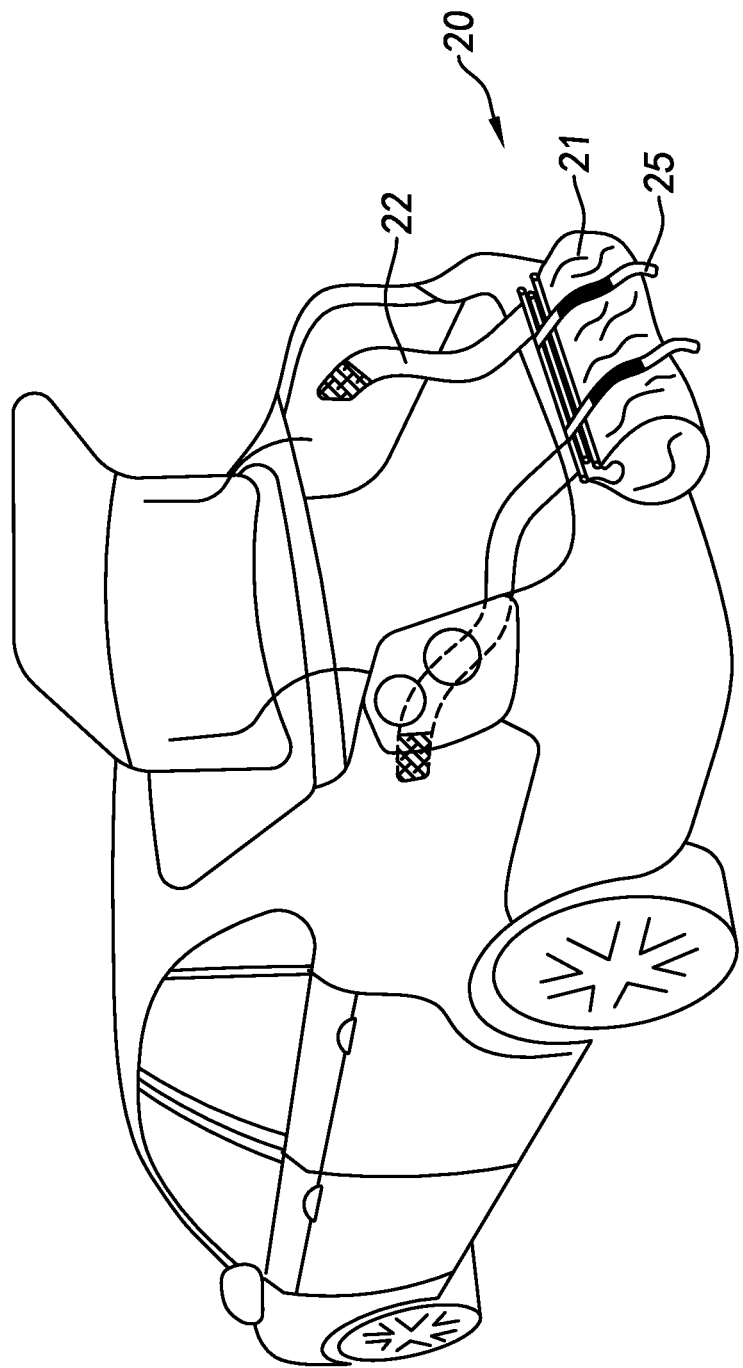

As shown in FIG. 4A and FIG. 4B of the drawings, the free end of the fastening member 22 can be extended into and fixed on the lateral, the floor or the likes of the trunk of the vehicle. It is worth mentioning that the free of the fastening member 22 has a hook and loop fastener, i.e. "VELCRO", for coupling with or detaching from the trunk of the vehicle.

Figure 5:
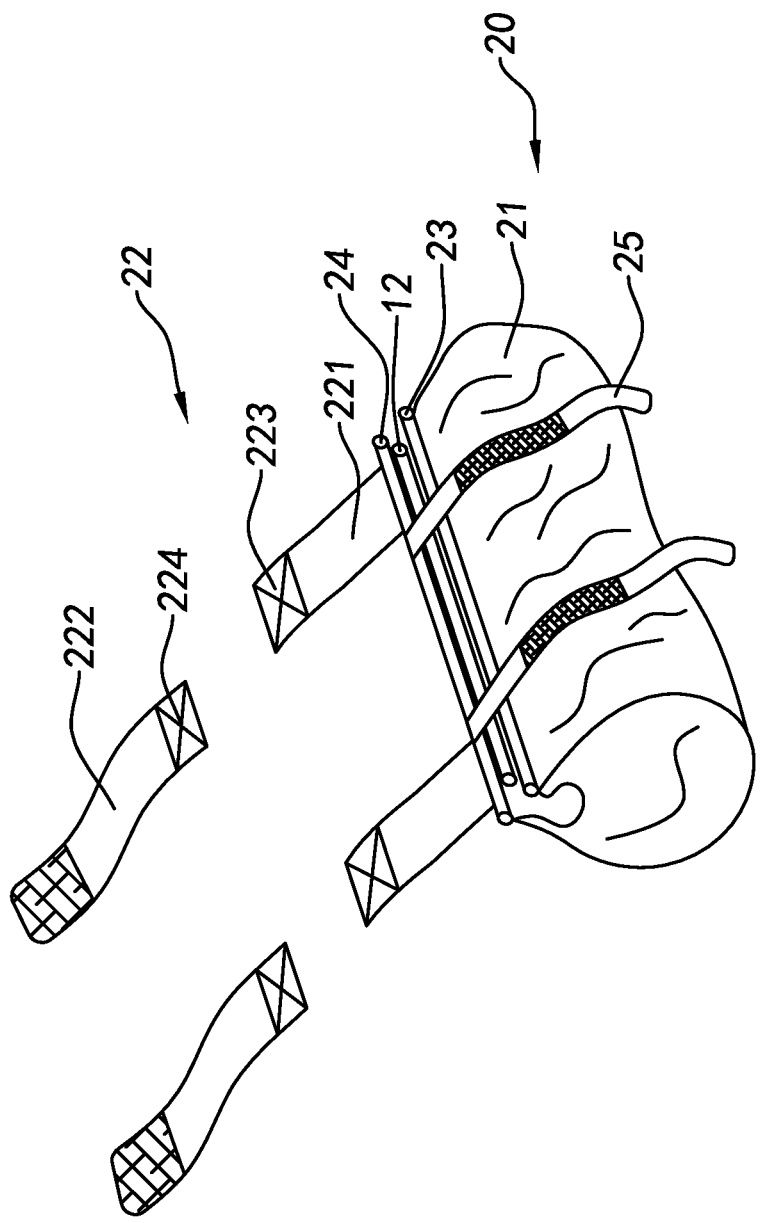
FIG. 5 is an alternative mode of the fastening member of the shelter for vehicle according to the above preferred embodiment of the present invention.
Figure 6:
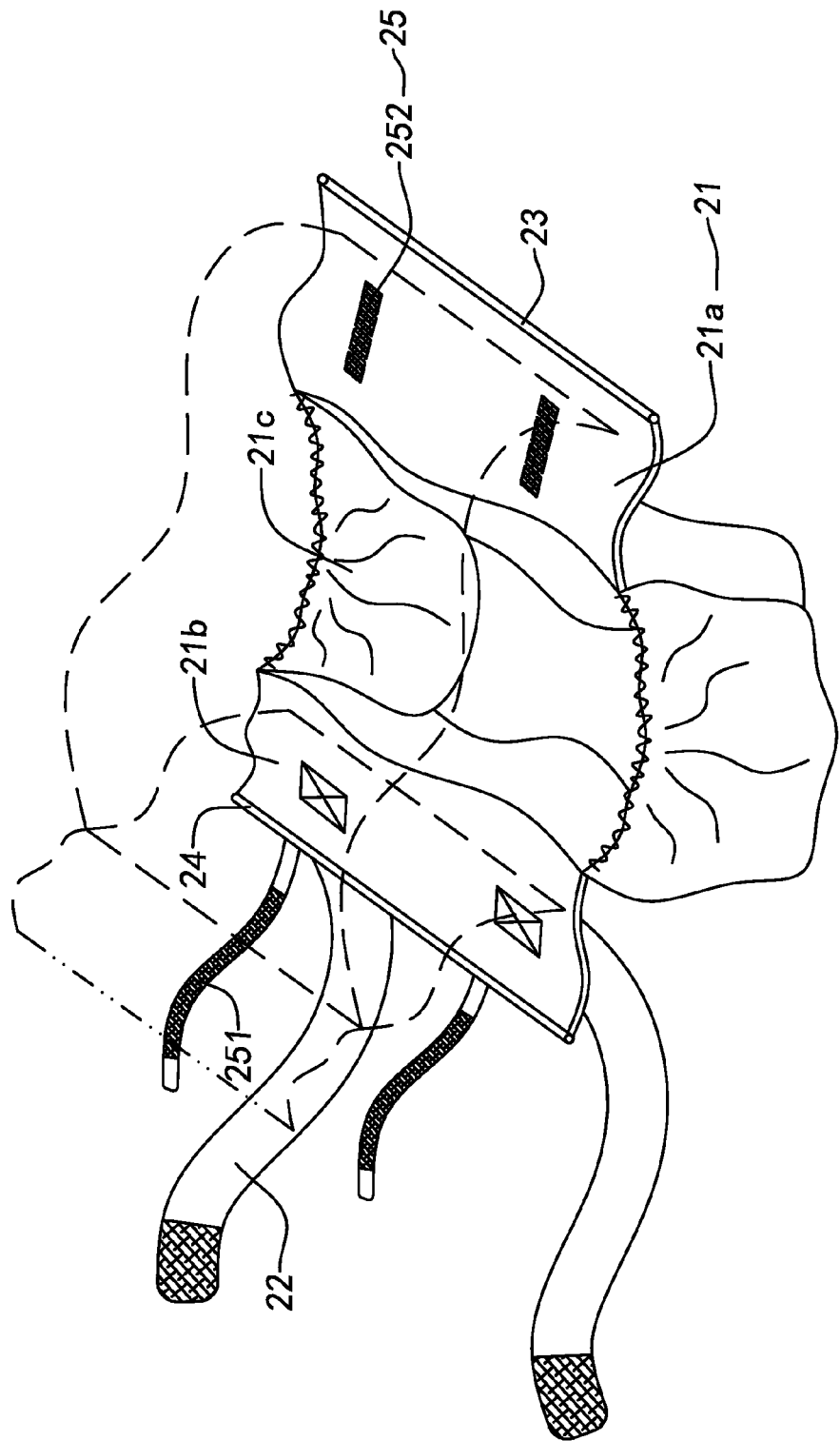
FIG. 6 is a perspective view of an accessory unit of the shelter for vehicle according to the above preferred embodiment of the present invention.

Referring to FIG. 5 of the drawings, an alternative mode of the fastening member 22 according to the above preferred embodiment of the present invention is illustrated, wherein the fastening member 22 comprises a first fastening element 221 extended to the container member 21, and a second fastening element 222 can be fixed on the vehicle, wherein the first fastening element 221 is capable of detachably connecting with the second fastening element 22 for fixing the shelter for vehicle on the vehicle.

In some embodiment of the present invention, the second fastening element 222 has a "VELCRO" for coupling with or detaching from the trunk of the vehicle.

Moreover, the fastening member 22 further comprises a first connector element 223 provided on the end of the first fastening element 221, and a second connector element 224 provided on the end of the second fastening element 222, wherein the first connector element 223 is capable of detachably connecting with the second connector element 224 quickly and reliably.

According to the preferred embodiment of the present invention, wherein the utility body 21 has a front wall 21a, a rear wall 21b, and two sidewall 21c respectively having two edges extended to the edges of the front wall 21a and the rear wall 21b, to define the receiving cavity 211 for storing the utility body 11 of the cover arrangement 10 when the shelter for vehicle is not in use. It is worth mentioning that the traction member 12 is also received in the receiving cavity 211 of the container member 21 when the utility body 11 is stored therein.

Particularly, the edge of the front wall 21a and the rear wall 21b can be affixed with each other for sealing the opening of the receiving cavity 211 so as to store the utility body 11 of the cover arrangement 10 within reliably.

The accessory unit 20 further comprises a first elongated supporting element 23 provided on the edge of the front wall 21a, and a second elongated supporting element 24 provided on the edge of the rear wall 21b, wherein the utility body 11 extends from the traction member 12 to the first elongated supporting element 23. The first elongated supporting member 23 is capable of positioning at the rear portion of the vehicle, such as at the rear bumper thereof, and the traction member 12 is capable of positioning at the front portion of the vehicle, such as in front of the front bumper, when the utility body 11 is in use. In particular, the first and second elongated supporting elements 23, 24 not only retain the shape of the container body 11 to receive the utility body 11 when the utility body 11 is folded up but also retain the container member 21 for covering at the rear side of the vehicle when the utility body 11 is forwardly extended for covering on the vehicle.

It is worth mentioning that the first elongated supporting element 23 and the second elongated supporting element 24 are made of rigid materials in such a manner the first elongated supporting element 23 and the second elongated supporting element 24 is capable of supporting the edge of the front wall 21a and the rear wall 21b, in this way, the utility body 11 can be stored in the receiving cavity 211 conveniently and easily.

According to the preferred embodiment of the present invention, wherein the utility body 11 extends from the traction member 12 to the edge of the front wall 21a of the container member 21, that is, the rear lateral side of the utility body 11 may fix on the first elongated supporting element 23. In other words, the rear lateral side of the utility body 11 is extended from the front wall 21a of the container member 21. On the other hand, the user should position the first elongated supporting element 23 at the rear portion of the vehicle while the user positions the traction member 12 at the front position of the vehicle after the utility body 11 covering the surface of the vehicle.

Accordingly, the user is able to move the traction member 12 from the front portion of the vehicle to the rear portion of the vehicle, so that the utility body 11 is capable of removing from the surface of the vehicle.

It is worth mentioning that the utility body 11 has an exterior surface and an interior surface opposite to the exterior surface, wherein the exterior surface and the interior surface cannot be touched with each other to avoid the pollutant on the exterior surface polluting the interior surface when the utility body 11 is removed from the surface of the vehicle.

Figure 7A:
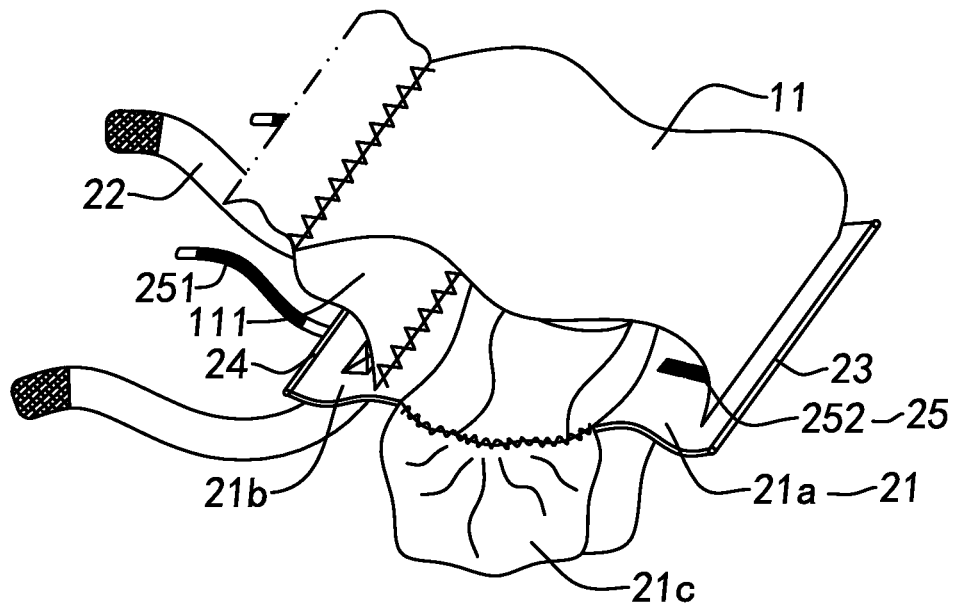
FIG. 7A and FIG. 7B illustrate the two different fixed ways between the utility body of the cover arrangement and container member of the accessory unit according to the above preferred embodiment of the present invention.

According to the preferred embodiment of the present invention, as shown in FIG. 7A of the drawings, in order to ensure that the accessory unit can be automatically hidden under utility body 11 conveniently and easily when the utility body 11 is in use, the utility body 11 comprises an extended element 111 further extended from the utility body 11 to the rear wall 21b of the container member 21, in such a manner that the size of the receiving cavity 211 matches with the utility body 11 suitably. In other words, the extended element 111 will be covered by the utility body 11 when the utility body 11 covers at the rear side of the vehicle.

Figure 7B:
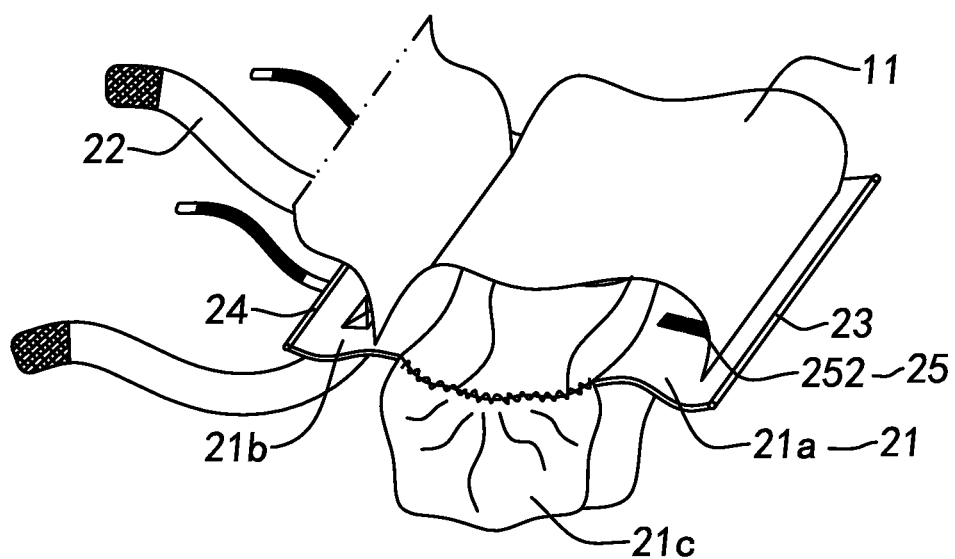

Alternatively, as shown in FIG. 7B of the drawings, in order to ensure that the accessory unit 20 can be automatically hidden under the utility body 11 when the utility body 11 is in use, the utility body 11 further connects with the rear wall 21b of the container member 21. Therefore, the container member 21 will be covered by the utility body 11 when the rear lateral side of the utility body 11 is retained at the rear side of the vehicle.

Particularly, the end of the fastening member 22 extends to the rear wall 21b of the container member 21 in such a manner that the opening of the receiving cavity 211 is a top opening when the shelter for vehicle is hung at the rear portion of the vehicle. Preferably, the top edges of the sidewall 21c along the top opening are elastic edges that two elastic elements are provided at the top edges of the sidewall 21c.

According to the preferred embodiment of the present invention, wherein the accessory unit further comprises a plurality of connecting locker members 25, wherein the connecting locker members 25 respectively have a first connecting locker element 251 provided on the front wall 21a of the container member 25, and a second connecting locker element 252 provided on the rear wall 21b of the container member 25, wherein the first connecting locker element 251 is capable of detachably locking the second connecting locker element 252 for sealing and closing the opening of the receiving cavity 211 after the utility body 11 stored in the receiving cavity 211.

It is worth mentioning that the first connecting locker element 251 and the second connecting locker element 252 are "VELCRO".

As shown in FIG. 2A and FIG. 2B of the drawings, according to the preferred embodiment of the drawings, wherein the cover arrangement 10 further comprises a crimple member 13 provided along the edge of the utility body 11, wherein the crimple member 13 is capable of automatically minimizing the size of the edge of the utility body 11 in such a manner that the utility body 11 can be covered the surface of the vehicle steadily and reliably.

Specifically, the crimple member 13 comprises two elastic crimple element 131 symmetrically provided along the edge of the utility body 11 from the first elongated supporting element 23 to the predetermined portion, to form pleated type structure. It is worth mentioning that the size of the edge of the utility body 11 can be automatically minimized after the utility body 11 covering on or removing form the surface of the vehicle.

Alternatively, the crimple member 13 further comprises two non-elastic crimple element 132 symmetrically provided along the edge of the utility body 11 from the traction member 12 to the predetermined portion, the edge of the utility body 11 is capable of forming a pleated type structure when the free end of the non-elastic crimple element 132 be pulled, in such a manner that the size of the edge of the utility body be changed.

It is worth mentioning that the non-elastic crimple element 132 respectively extend and connect each other for using conveniently and easily.

Figure 8:
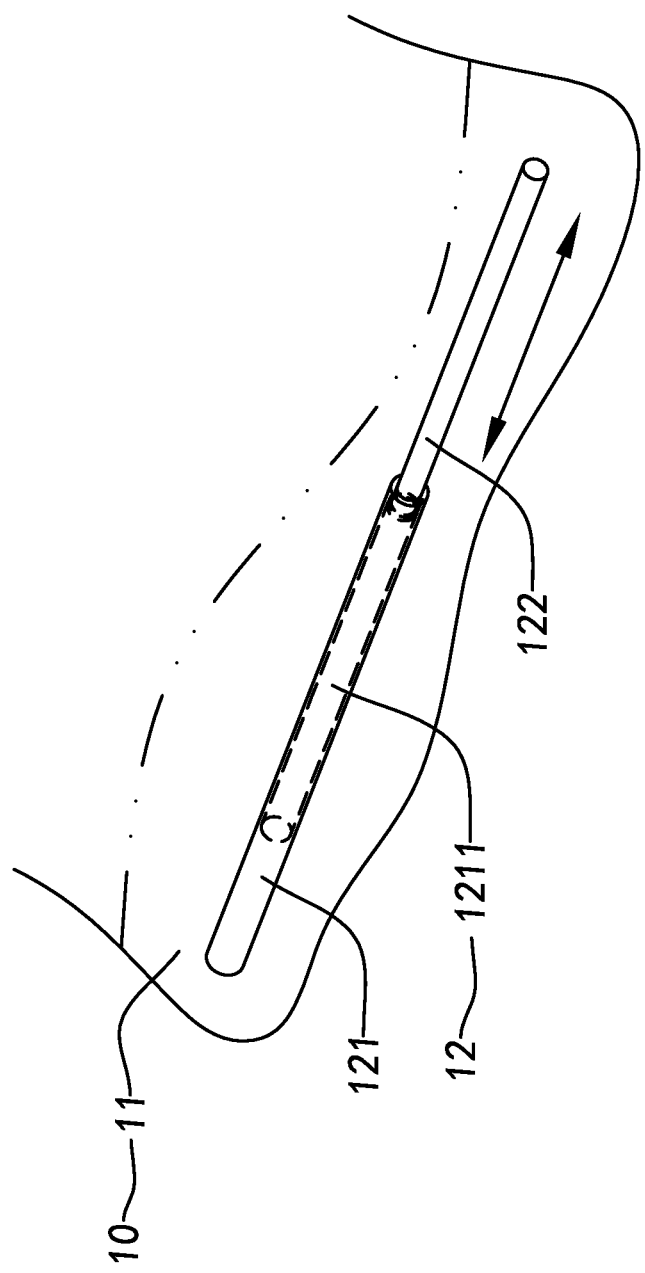
FIG. 8 is an alternative mode of the traction member of the cover arrangement according to the above preferred embodiment of the present invention.

As shown in FIG. 8 of the drawings, a alternative mode of the traction member 12 of the cover arrangement 10 according to the above preferred embodiment of the present invention is illustrated, wherein the traction member 12 comprises a first traction element 121 having a guider channel 1211 and a second traction element 122 designed in the guider channel 1211, wherein the second traction element 122 is capable of moving along track formed by the guider channel 1211, so that the length of the traction member 12 will be adjustably changed for supporting the front lateral side of the utility body 11 according to a width of the front side of the vehicle when the utility body 11 is in use. In other words, the traction member 12 is a length-adjustable member for selectively adjusting the length of the traction member 12 according to the width of the front side of the vehicle.

It is worth mentioning that, even in the large wind environment, the utility body 12 can be covered to the surface of the vehicle by single than conventional shelter.

Moreover, the utility body 11 has two light portions 112 symmetrically provided on the front of the utility body 11, wherein the shape of the light portion 112 match with the side mirror of the vehicle in such a manner that the utility body 11 is capable of removing from the surface of the vehicle conveniently and easily.

Figure 9:
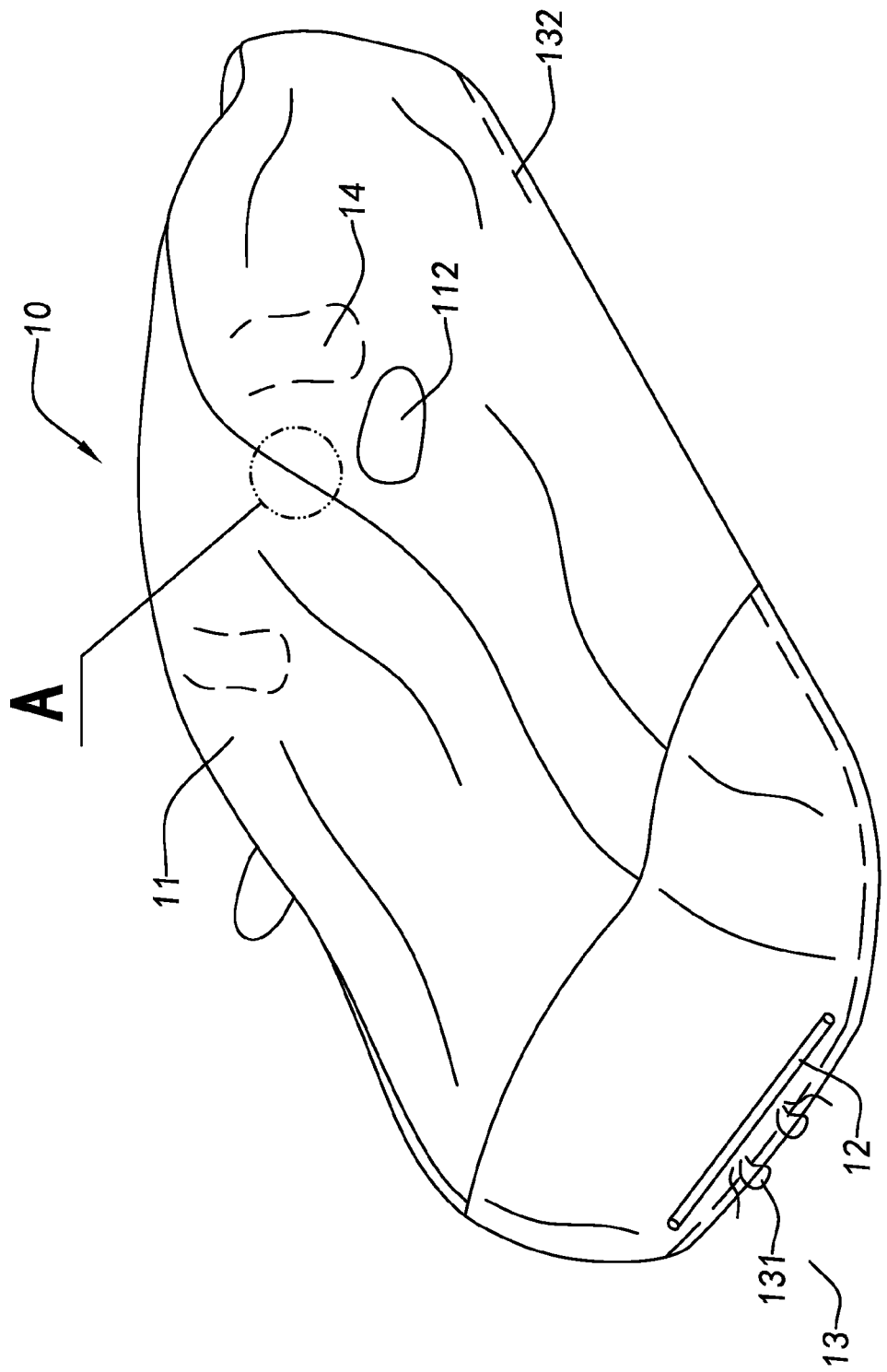
FIG. 9 is a selective view of a utility member of the cover arrangement according to the above preferred embodiment of the present invention.

As shown in FIG. 9 of the drawings, the cover arrangement 10 further comprises a plurality of lockers 14 spacedly provided on the interior of the utility body 11, wherein the locker 14 is capable of locking in the vehicle, such as the door of the vehicle, in such a manner that the utility body 11 can be covered the surface of the vehicle steadily and reliably.

In some embodiments of the present invention, the utility body 11 comprises a plurality of area elements, wherein the edges of adjacent the area elements join together for forming the entire utility body 11.

Figure 10:
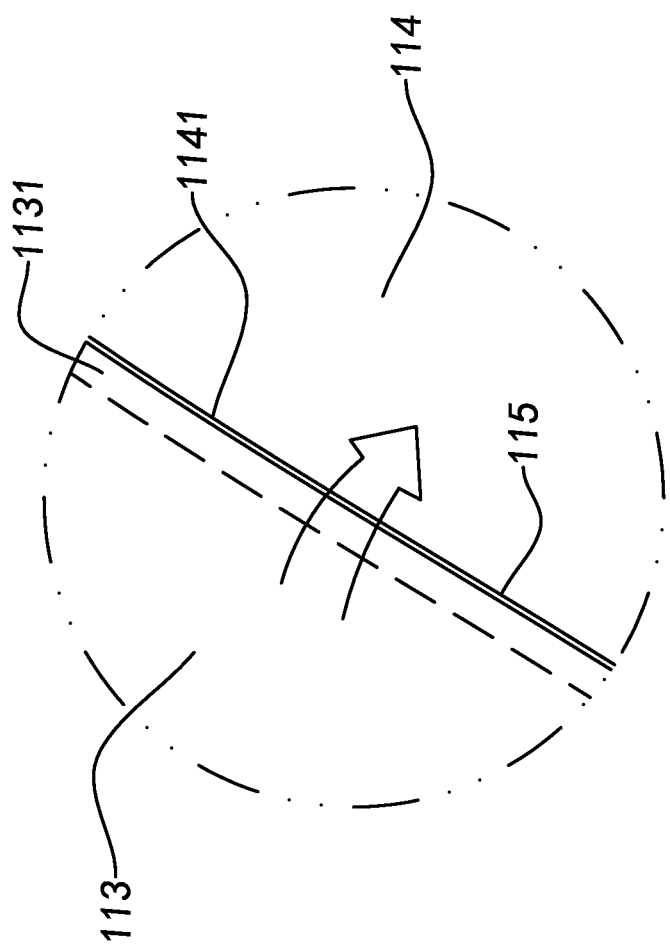
FIG. 10 illustrates the connection method of adjacent area element forming the utility body of the cover arrangement according to the above preferred embodiment of the present invention.
Figure 11:
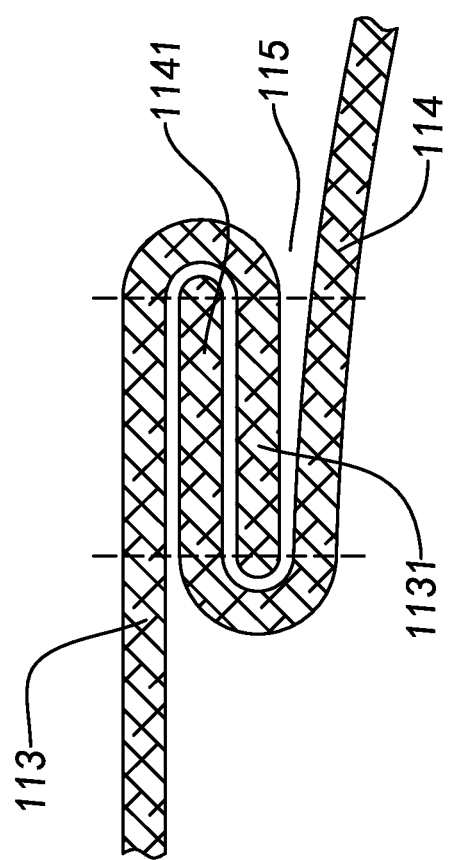
FIG. 11 is a sectional view of the connection method of the area element forming the utility body of the cover arrangement according to the above preferred embodiment of the present invention.

Referring to FIG. 10 of the drawings, the applicant describes two area element's edge as an example in the specification. The utility body 11 comprises a first area element 113 and a second area element 114, wherein the first area element 113 positions at the top of the vehicle and the second area element 114 positions at the lateral of the vehicle when the utility body 11 is in use.

It is worth mentioning that the edge of the first area element 113 overlaps on the edge of the second area element 114, to form a stitch groove 115, wherein the opening of the stitch groove 115 towards to the outer edge of the utility body 11 for preventing the water infiltration when the utility body 11 is in use.

According to the preferred embodiment of the present invention, wherein the first area element 113 has a first edge 1131 overlappedly folding in 180 degrees for forming a first connecting channel 1132, accordingly, the second area element 114 has a second edge 1141 overlappedly folding out 180 degrees for forming a second connecting channel 1142.

Particularly, the first edge 1131 of the first area element 113 positions in the second connecting channel 1142 of the second area element 114, accordingly, the second edge 1141 of the second area element 114 positions in the first connecting channel 1132 of the first area element 113.

According to the preferred embodiment of the present invention, the present invention further provides a method for using the shelter wherein the method comprises following steps.

Figure 12A:
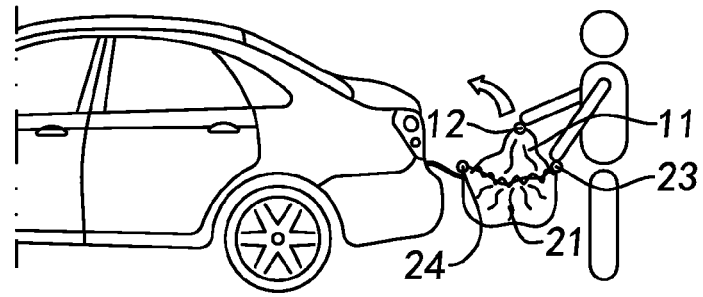
FIG. 12A to FIG. 12C illustrating the operation of the shelter to cover the vehicle according to the above preferred embodiment of the present invention.

(a) Detachably couple the container member 21 at the rear side of the vehicle, as shown in FIG. 12A, wherein the container member 21 is opened up for removing the utility body 11 from the receiving cavity 211 of the container member. It is worth mentioning that the first elongated supporting element 23 is provided on the rear lateral side of the utility body 11 and is capable of positioning the utility body 11 at the rear portion of the vehicle.

Figure 12B:
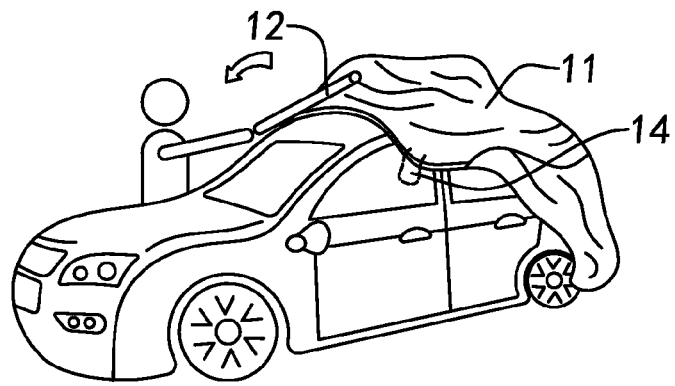

(b) Unfold the utility body 11 to pull the front lateral side thereof forward by the traction member 12, wherein the lockers 14 are locked to the vehicle at the door or the window thereof, as shown in FIG. 12B. It is worth mentioning that the container member 21 is remained attached to the rear side of the vehicle when the front lateral side of the utility body 11 is pulled forward.

Figure 12C:
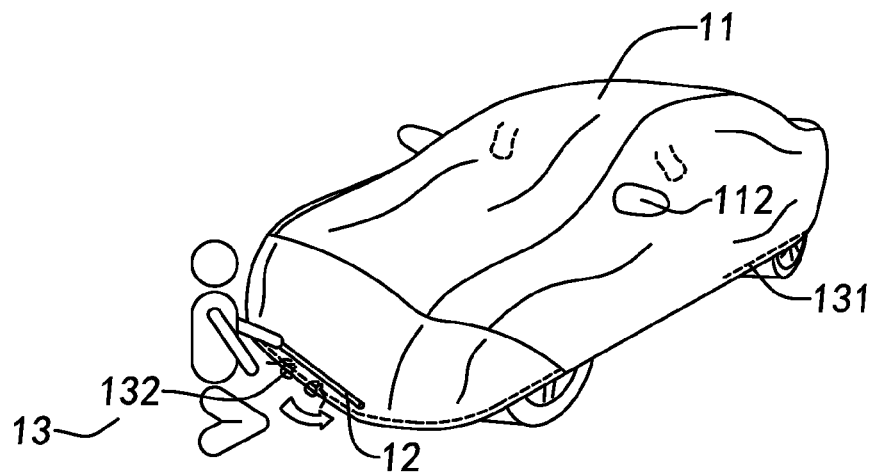

(c) Retain the traction member 12 at the front side of the vehicle to hold the front lateral side of the utility body 11 at the front side of the vehicle in order to cover the vehicle, as shown in FIG. 12C.

The method for uncovering the shelter from the vehicle comprises following steps.

Figure 13A:
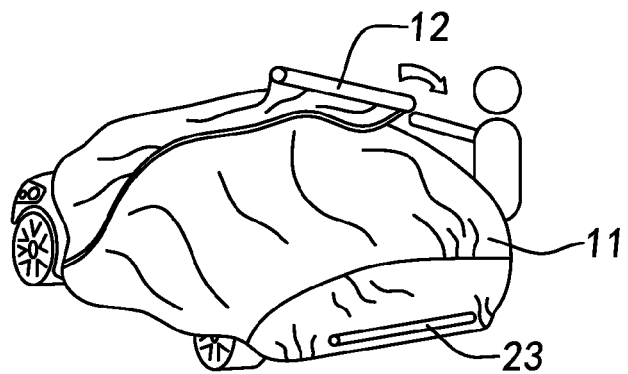
FIG. 13A to FIG. 13C illustrating the operation of the shelter to uncover the vehicle according to the above preferred embodiment of the present invention.

(1) Remove the traction member 12 from the front side of the vehicle in order to pull the front lateral side of the utility body 11 toward the rear side of the vehicle, as shown in FIG. 13A.

Figure 13B:
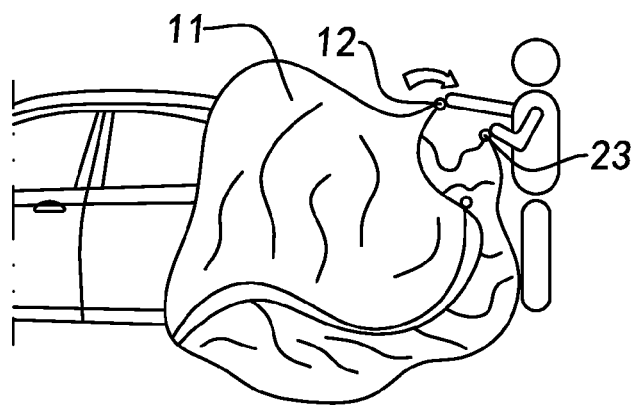

(2) Overlap the traction member 12 with the first elongated supporting element 23, as shown in FIG. 13B, such that the container member 21 is opened up and the utility body 11 is folded in half.

Figure 13C:
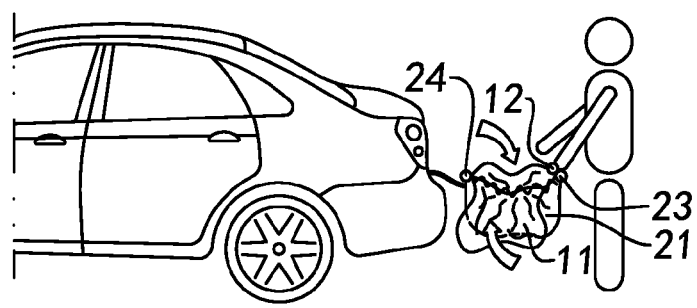

(3) Receive the utility body 11 and the traction member 12 in the container member 21. It is worth mentioning that the container member 21 is remained attached to the rear side of the vehicle when receiving the utility body 11 in the container member 21. In addition, the user is able to use one hand to hold the traction member 12 and the first elongated supporting element 23 to fully open up the opening of the container member 21 while another hand to pull the utility body 11 into the container member 21 through the opening thereof, as shown in FIG. 13C. After the utility body 11 is received in the container member 21, the opening of the container member 21 can be closed by the connecting locker members 25 and the container member 21 can be stored in the trunk or hung at the rear bumper of the vehicle.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A shelter for covering an outer surface of a vehicle, comprising:
an accessory unit which comprises a container member adapted for being detachably affixed at a rear side of said vehicle, wherein said container member has an opening and a receiving cavity, wherein said container member further has a front wall and a rear wall for affixing with each other to seal said opening; and
a cover arrangement which comprises a utility body having a rear lateral side extended from said front wall of said container member, wherein said utility body is unfolded to extend from said container member toward a front side of said vehicle for covering the vehicle and is folded to be stored in said receiving cavity of said container member through said opening thereof, wherein said utility body is further connected with said rear wall of said container member in such a manner that when said utility body is unfolded for covering the vehicle, said utility body pulls up said rear wall of said container member to hide said container member between the vehicle and said utility body.

2. The shelter, as recited in claim 1, wherein said cover arrangement further comprises a traction member provided at a front lateral side of said utility body for retaining said front lateral side of said utility body at said front side of said vehicle.

3. The shelter, as recited in claim 2, wherein said traction member is a length-adjustable member for selectively adjusting a length of said traction member to support said front lateral side of said utility body according to a width of said front side of said vehicle.

4. The shelter, as recited in claim 1, wherein said container member further has two sidewalls, wherein said front wall, said rear wall and said two sidewalls defines said receiving cavity therewithin.

5. The shelter, as recited in claim 3, further has two sidewalls, wherein said front wall, said rear wall and said two sidewalls defines said receiving cavity therewithin.

6. The shelter, as recited in claim 4, wherein said accessory unit further comprises a first elongated supporting element provided at said front wall of said container member and a second elongated supporting element provided at said rear wall of said container member, wherein said first elongated supporting element and said second elongated supporting element not only retain a shape of said container body to receive said utility body when said utility body is folded up but also retain said container member for covering at said rear side of said vehicle when said utility body is forwardly extended for covering on said vehicle.

7. The shelter, as recited in claim 5, wherein said accessory unit further comprises a first elongated supporting element provided at said front wall of said container member and a second elongated supporting element provided at said rear wall of said container member, wherein said first elongated supporting element and said second elongated supporting element not only retain a shape of said container body to receive said utility body when said utility body is folded up but also retain said container member for covering at said rear side of said vehicle when said utility body is forwardly extended for covering on said vehicle.

8. The shelter, as recited in claim 5, wherein said utility body comprises an extended element further extended from said utility body to said rear wall thereof.

9. The shelter, as recited in claim 7, wherein said utility body comprises an extended element further extended from said utility body to said rear wall thereof.

10. The shelter, as recited in claim 5, wherein said accessory unit further comprises a first connecting locker element provided on said front wall of said container member, and a second connecting locker element provided on said rear wall of said container member, wherein said first connecting locker element is detachably locked with said second connecting locker element for closing said opening of said receiving cavity after said utility body stored in said receiving cavity.

11. The shelter, as recited in claim 7, wherein said accessory unit further comprises a first connecting locker element provided on said front wall of said container member, and a second connecting locker element provided on said rear wall of said container member, wherein said first connecting locker element is detachably locked with said second connecting locker element for closing said opening of said receiving cavity after said utility body stored in said receiving cavity.

12. The shelter, as recited in claim 1, wherein said accessory unit further comprises a plurality of fastening members extended from said container member for detachably coupling said container member at said rear side of said vehicle, wherein free ends of said fastening members are extended from said container member into a trunk of said vehicle.

13. The shelter, as recited in claim 11, wherein said accessory unit further comprises a plurality of fastening members extended from said container member for detachably coupling said container member at said rear side of said vehicle, wherein free ends of said fastening members are extended from said container member into a trunk of said vehicle.

14. The shelter, as recited in claim 1, wherein said utility body comprises a first area element having a first edge overlappedly folded to form a first connecting channel, and a second area element having a second edge overlappedly folded to form a second connecting channel, wherein said first edge of said first area element and said second edge of said second area element are stitched together at a position that said first edge of said first area element is disposed along said second connecting channel of said second area element while said second edge of said second area element is disposed along said first connecting channel of said first area element.

15. The shelter, as recited in claim 13, wherein said utility body comprises a first area element having a first edge overlappedly folded to form a first connecting channel, and a second area element having a second edge overlappedly folded to form a second connecting channel, wherein said first edge of said first area element and said second edge of said second area element are stitched together at a position that said first edge of said first area element is disposed along said second connecting channel of said second area element while said second edge of said second area element is disposed along said first connecting channel of said first area element.

16. A method of manufacturing a shelter for covering a vehicle, comprising the steps of:
  (a) providing a container member for detachably coupling at a rear side of said vehicle, wherein said container member has an opening and a receiving cavity, wherein said container member further has a front wall and a rear wall for affixing with each other to seal said opening; and
  (b) forming a utility body to be normally received in said receiving cavity of said utility body, wherein said utility body has a rear lateral side extended from said front wall of said container member and a front lateral side arranged to extend to a front side of said vehicle for covering said vehicle, wherein said utility body is further connected with said rear wall of said container member in such a manner that when said utility body is unfolded for covering the vehicle, said utility body pulls up said rear wall of said container member to hide said container member between the vehicle and said utility body.

17. The method, as recited in claim 16, wherein the step (b) further comprises a step of providing a traction member at said front lateral side of said utility body for retaining said front lateral side of said utility body at said front side of said vehicle.

18. The method, as recited in claim 17, wherein the step (a) further comprises a step of providing a first elongated supporting element and a second elongated supporting element at a front wall and a rear wall of said container member respectively, wherein said first elongated supporting element and said second elongated supporting element not only retain a shape of said container body to receive said utility body when said utility body is folded up but also retain said container member for covering at said rear side of said vehicle when said utility body is forwardly extended for covering on said vehicle.

19. The method, as recited in claim 18, wherein the step (b) further comprises a step of further extending an extended element of said utility body from said front wall of said container member to said rear wall thereof.

20. The method, as recited in claim 18, wherein the step (a) further comprises a step of providing a first connecting locker element and a second connecting locker element on said front wall and said rear wall of said container member respectively, wherein said first connecting locker element is detachably locked with said second connecting locker element for closing said opening of said receiving cavity after said utility body stored in said receiving cavity.

21. The method, as recited in claim 20, wherein the step (a) further comprises a step of providing a plurality of fastening members which are extended from said container member for detachably coupling said container member at said rear side of said vehicle, wherein free ends of said fastening members are extended from said container member into a trunk of said vehicle.

\* \* \* \* \*